(12) United States Patent
Schrock et al.

(10) Patent No.: US 12,214,899 B1
(45) Date of Patent: Feb. 4, 2025

(54) PROPELLER RESTRAINT KITS FOR TURBOPROP AIRCRAFT

(71) Applicant: Textron Aviation Inc., Wichita, KS (US)

(72) Inventors: Russell Ray Schrock, Wichita, KS (US); Michael Earl Lee, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 18/490,996

(22) Filed: Oct. 20, 2023

(51) Int. Cl.
*B64D 47/00* (2006.01)

(52) U.S. Cl.
CPC ................... *B64D 47/00* (2013.01)

(58) Field of Classification Search
CPC ........ B64C 27/006; B64C 27/50; B64D 47/00
See application file for complete search history.

(56) References Cited

U.S. PATENT DOCUMENTS

| | | | | |
|---|---|---|---|---|
| 2,609,164 | A * | 9/1952 | Dillon | B64D 29/08 244/121 |
| 4,290,569 | A * | 9/1981 | McIntyre | B64F 1/005 244/129.4 |
| 7,207,519 | B2 * | 4/2007 | Hoynash | B64C 27/50 248/598 |
| 8,500,059 | B2 * | 8/2013 | Beasley | B25B 9/02 244/17.11 |
| 9,421,673 | B2 * | 8/2016 | Dunmire | B64C 27/50 |

* cited by examiner

*Primary Examiner* — Brian M O'Hara
(74) *Attorney, Agent, or Firm* — NIXON & VANDERHYE P.C.

(57) ABSTRACT

Propeller restraint kits for turboprop aircraft are provided which include at least one, and preferably a pair, of propeller restraint systems. Each propeller restraint system will preferably include an open-ended propeller restraint boot that may be formed of a flexible and durable fabric material which is sized and configured for placement over the tip of a propeller blade. A cowling attachment assembly is provided in the kit and is adapted to being attached to an aircraft cowling skin. A propeller boot tether strap of predetermined length interconnects the propeller restraint boot and the cowling attachment assembly. The cowling attachment assembly includes (i) a quick disconnect (QD) pin assembly connected to a terminal end of the propeller boot tether strap, and (ii) a pin receiver adapted to being positionally attached to an interior portion of the aircraft cowling skin.

28 Claims, 5 Drawing Sheets

PROPELLER RESTRAINT KITS FOR TURBOPROP AIRCRAFT

FIELD

The embodiments disclosed herein relate generally to kits which when installed will positionally restrain propellers of a turboprop aircraft when the aircraft is parked.

BACKGROUND

The propellers of most turboprop aircraft are capable of spinning freely during engine shutdown, e.g., as may occur when the propellers encounter sufficient sustained winds and/or wind gusts. The free-spinning propellers during engine shut-down could in turn damage the internal turbine engine components due to lack of oil circulation. It is therefore conventional practice for operators of turboprop aircraft to restrain propeller movement when the aircraft is parked for prolonged time periods.

Most conventional propeller restraints employ a harness that includes pairs of tethered propeller boots and exhaust pipe boots which are placed over the propeller tips of an adjacent pair of propellers and the terminal end of the turbine engine exhaust pipe on each side of the aircraft's engine cowling. The pair of propellers are therefore positioned by the propeller restraints in an inverted V-shaped configuration so as to not impede attachment of a tow bar to the aircraft's nose gear for ground handling. An extensible (bungee-type) cord or a length adjustable strap is typically employed to tether under tension each of the propeller boots to a respective exhaust pipe boot when installed. The tension between the propeller boot and exhaust pipe boot when each is installed over the propeller tips and the terminal ends of the exhaust pipes is typically sufficient to prevent free-spinning of the propeller blades.

Over time, however, the tethers may not provide the desired tension when the propeller and exhaust pipe boots are installed, e.g., bungee-type cords may stretch and the length adjuster of a length-adjustable strap may become worn. Thus, there are problems with the conventional propeller restraints for turboprop aircraft maintaining secure and reliable installation tension over time. It is therefore towards providing solutions to such problems that the embodiments disclosed herein are directed.

SUMMARY

The embodiments disclosed herein are directed toward propeller restraint kits for turboprop aircraft which include at least one, and preferably a pair of propeller restraint systems. Each propeller restraint system will preferably include an open-ended propeller restraint boot that may be formed of a flexible and durable fabric material which is sized and configured for placement over a tip of a propeller blade. A grommeted drain hole may be provided in the restraint boot to allow drainage of water that may enter the boot during use. A cowling attachment assembly is provided in the kit and is adapted to being attached to an aircraft cowling skin. A propeller boot tether strap of predetermined length interconnects the propeller restraint boot and the cowling attachment assembly. The propeller boot tether strap may be of a predetermine fixed non-extensible length or may include a length adjuster to allow length adjustment of the propeller restraint tether strap.

The cowling attachment assembly includes (i) a quick disconnect (QD) pin assembly connected to a terminal end of the propeller boot tether strap, and (ii) a pin receiver adapted to being positionally attached to an interior portion of the aircraft cowling skin. The QD pin assembly may comprise a strap swivel connected to the terminal end of the propeller boot tether strap. The pin receiver will preferably include a pin receiving cylinder which is adapted to being positioned relative to a mounting hole in the aircraft cowling skin to receive the quick disconnect pin and thereby removably attach the QD pin assembly to the pin receiver.

According to preferred embodiments, the pin receiver will include a mounting flange for attaching the pin receiver to the interior portion of the aircraft cowling skin. The mounting flange may define a series of apertures adapted to receiving a rivet to immovably attach the mounting flange to the interior portion of the aircraft cowling skin. In some embodiments, an annular boss extends outwardly from a facing surface of the mounting flange, the annular boss being sized and configured to be positioned within the mounting hole of the aircraft cowling skin.

According to certain embodiments, a plug member may be moveably positioned within the receiving cylinder to plug the receiving cylinder upon disconnection of the QD pin and the pin receiver. The plug member may include a plug head and a plug stem having a terminal end coaxially extending outwardly from the receiving cylinder. A retaining pin may be attached to the terminal end of the plug stem. The cylindrical pin receiver may further include a compression spring positioned within the receiving cylinder so as to operably exert spring force on the plug member in a direction which closes the cylindrical pin receiver by the plug head.

An exhaust pipe boot which is sized and configured to being placed over an end of an aircraft engine exhaust pipe may optionally be included with each of the propeller restraint systems. If present, the exhaust pipe boot will include an exhaust pipe boot tether strap having one end connected to the exhaust pipe boot and an opposite end connected to an intermediate portion of the propeller boot tether strap.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
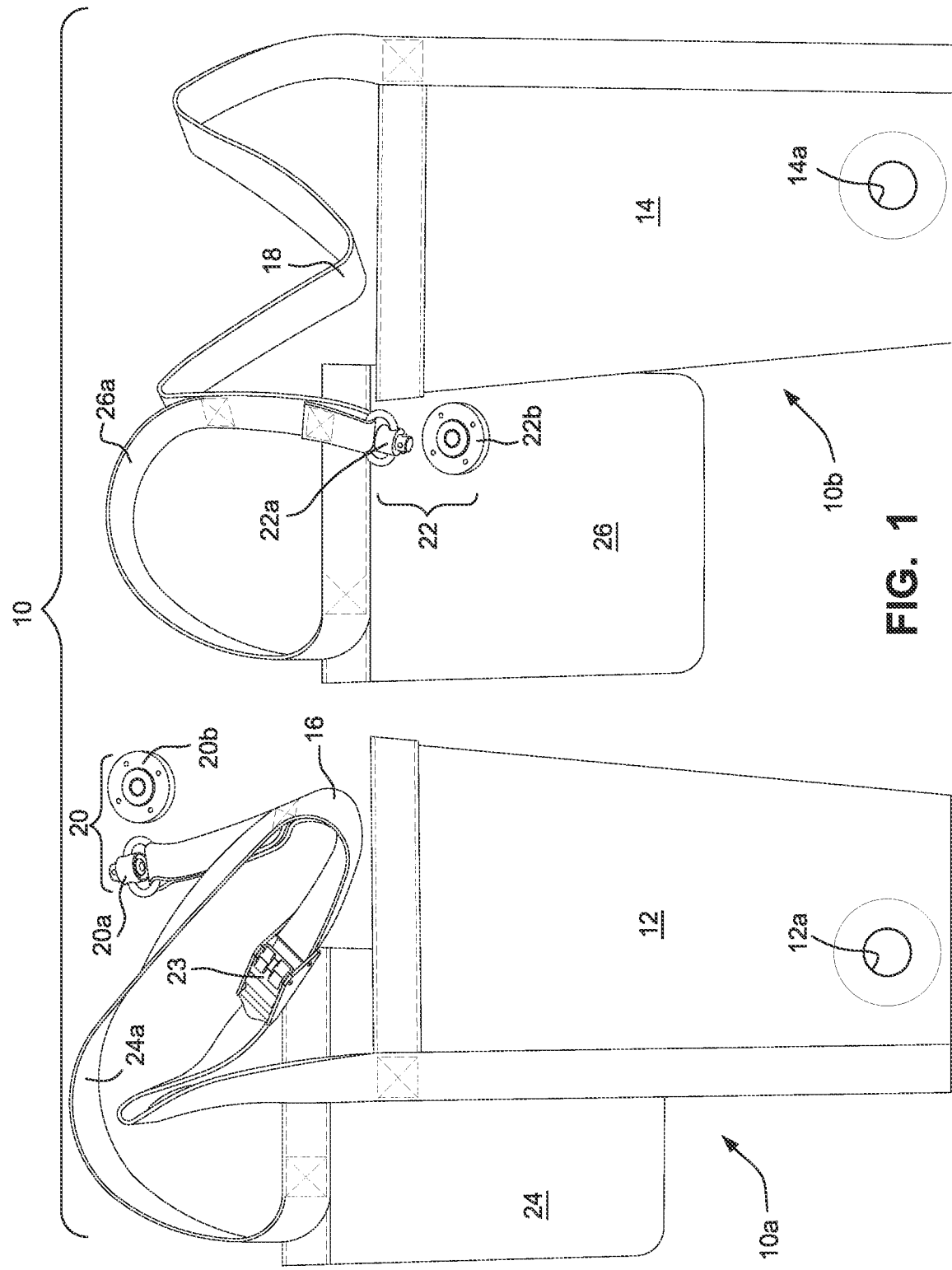
FIG. 1 shows a propeller restraint kit for a turboprop aircraft in accordance with an embodiment of this invention.
Figure 2:
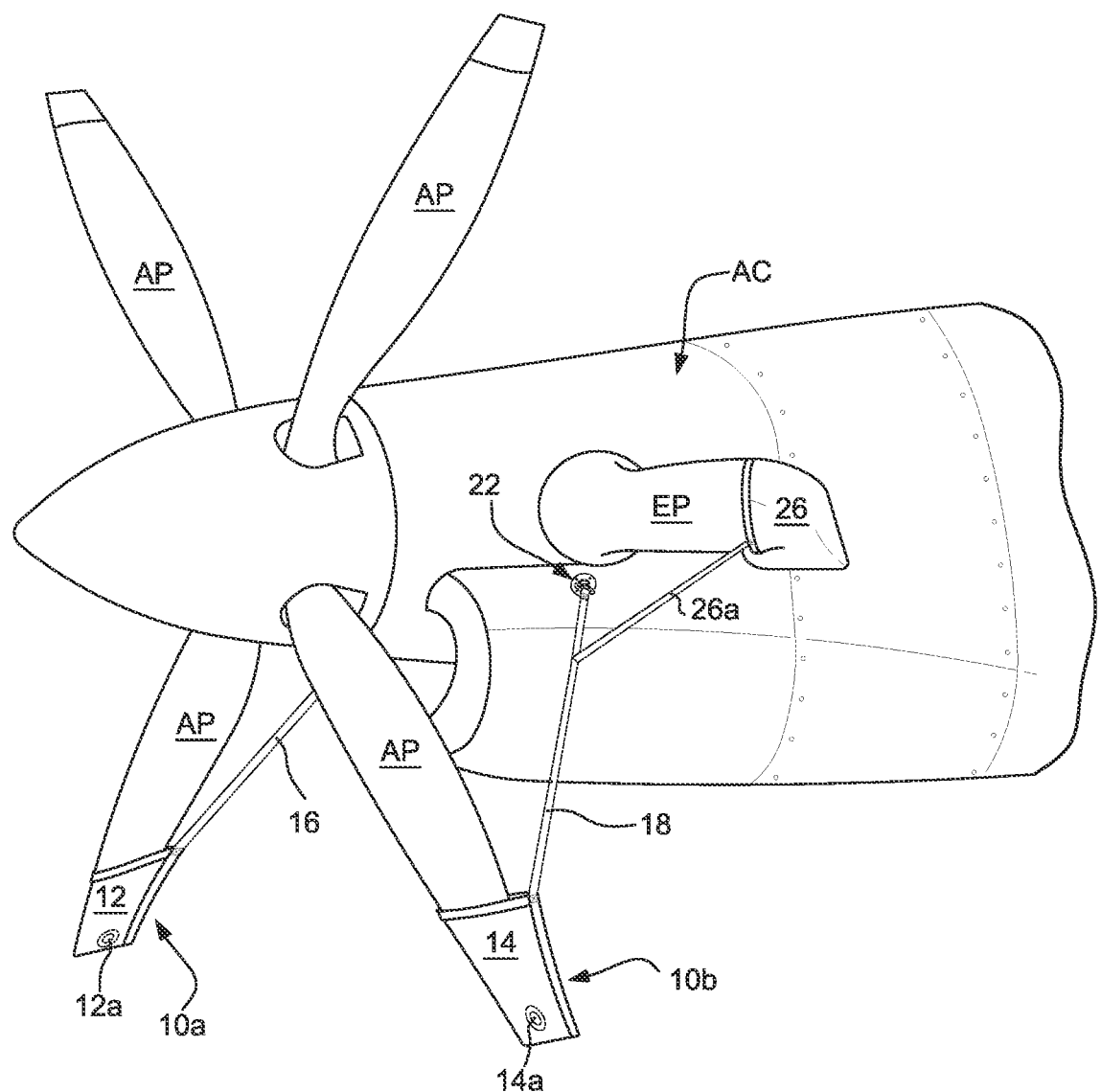
FIG. 2 is a perspective view of an engine cowling associated with a turboprop aircraft showing the propellers restraint kit of FIG. 1 installed to restrain the propellers.

Accompanying FIGS. 1 and 2 show a propeller restraint kit 10 adapted to being installed on a turboprop aircraft cowling AC so as to restrain movement of the aircraft propellers AP. In the embodiments shown in FIGS. 1 and 2, the kit 10 will necessarily include a pair of propeller restraint systems 10*a*, 10*b* which respectively include open-ended propeller boots 12, 14 formed of a flexible and durable fabric canvas-type material that are sized and configured to be placed over the tips of an adjacent pair of propellers AP. The propeller boots 12, 14 may include respective grommeted drain holes 12*a*, 14*a* near the closed bottom of the boots 12, 14 so as to allow water to drain therefrom.

Propeller boot tether straps 16, 18 are attached at one end to the upper portion of the propeller boots 12, 14 (e.g., via stitching as shown). Cowling attachment assemblies 20, 22 are provided with each being comprised of a QD swivel pin 20*a*, 22*a* attached to the opposite end of the tether straps 16, 18 and a pin receiver 20*b*, 22*b* which is adapted to being fixed to the aircraft cowing AC, respectively. The length of each of the straps 16, 18 may be of a predetermined fixed length to allow the respective propeller boot 12, 14 to be placed on the tips of the propeller blades and the QD swivel pin 20*a*, 22*a* to be engaged with the pin receiver 20*b*, 22*b* when the latter is immovably installed on the aircraft cowling AC. Optionally, however, one (or both) of the straps 16, 18 may include a strap adjuster 23 as shown.

The propeller restrain kit 10 may optionally include a pair of open ended exhaust pipe boots 24, 26 which are sized and configured to be placed over the terminal ends of the exhaust pipes EP extending outwardly and rearwardly from each side of the aircraft cowling AC. If present, the optional exhaust pipe boots 24, 26 will preferably include exhaust pipe boot tether straps 24*a*, 26*a* which serve to interconnect the exhaust pipe boots 24, 26 to an intermediate portion of the propeller boot tether straps 16, 18, respectively. The exhaust pipe boot tether straps 24*a*, 26*a* are preferably of fixed predetermined length sufficient to extend between the exhaust pipe boots and the propeller boot straps 16, 18 when the boots 12, 14 and 24, 26 are installed on the propellers AP and exhaust pipes EP, respectively. The exhaust pipe boots 24, 26 may alternatively be in the form of conventional compressible foam plugs which are physically inserted into the exhaust pipes EP at the terminal ends thereof.

Figure 3:
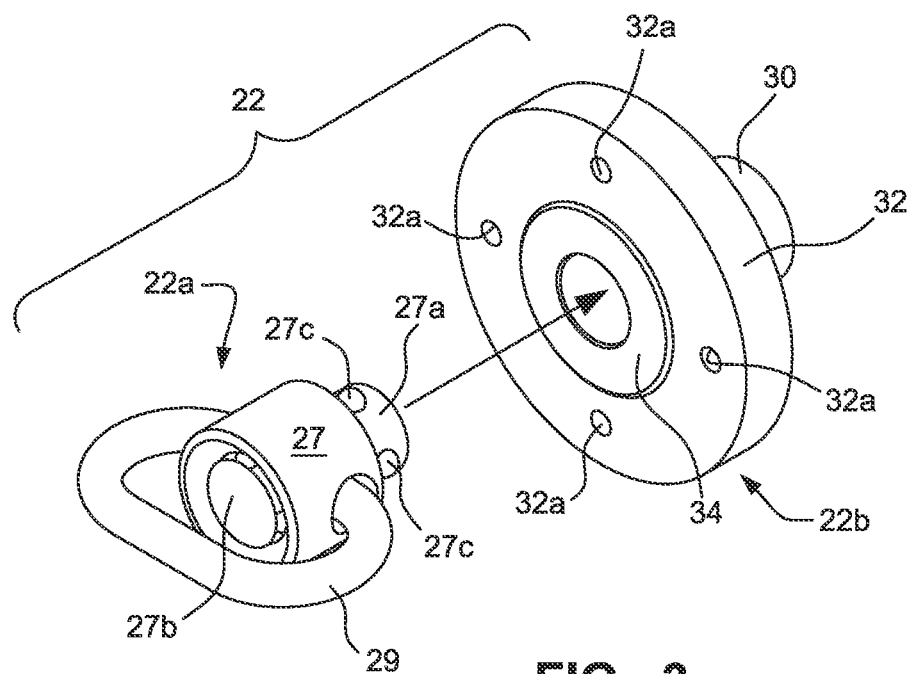
FIGS. 3 and 4 are front and rear perspective views of the uninstalled cowling attachment assembly employed in the propeller restraint kit showing the quick disconnect (QD) swivel pin disengaged from the pin receiver thereof.
Figure 4:
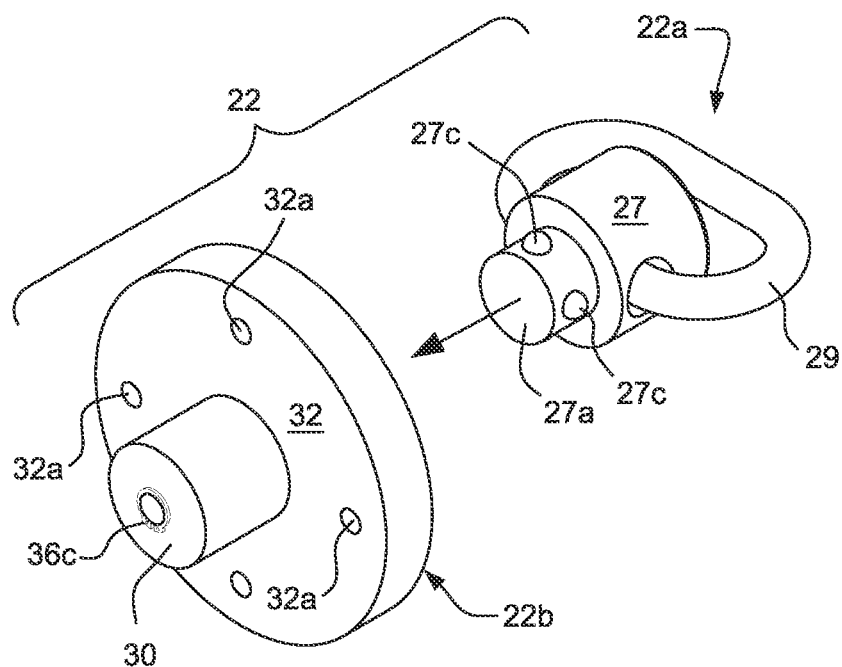

The cowling attachment assembly 22 is shown in an isolated manner in accompanying FIGS. 3 and 4 unconnected to the strap 18. It will be understood that the discussion below with regard to the cowling attachment assembly 22 is representative of and applies equally to the cowling attachment assembly 20.

The QD swivel pins 20*a* and 22*a* are in and of itself conventional and can be obtained commercially from a number of suppliers. The QD swivel pin 22*a* as shown in FIGS. 3-8 is thus structurally and functionally comparable to the swivel pin 20*a*. The QD swivel pin 22*a* will preferably include a pin body 27 having an outwardly extending engagement pin 27*a* and a strap swivel 29 that is connected to a terminal end of the propeller tether strap 18 (not shown in FIGS. 3 and 4 for clarity). The pin body 27 carries a spring-loaded plunger 27*b* which when manually depressed is operable to cause the ball detents 27*c* to be retracted and thereby allow the pin 27*a* to be inserted into the pin receiving cylinder 30 of the pin receiver 22*b* (see FIGS. 6 and 8). Upon release of the plunger 27*b*, the ball detents 27*c* will be immovably extended from the pin 27*a* and be received within the ball recesses 30*a* formed in the pin receiving cylinder 30 unitarily extending rearwardly from the mounting flange 32 (see FIGS. 6 and 8) thereby removably coupling the QD swivel pin 22*a* (and hence the propeller tether strap 18) to the pin receiver 22*b*.

The pin receiver 22*b* includes an annular boss 34 extending outwardly from facing surface of the mounting flange 32 by a distance corresponding substantially to the thickness of the skin forming the cowling AC. The annular boss 24 is therefore adapted to being mounted within a mounting hole 34*a* formed in the skin of the cowling AC in the vicinity of the exhaust pipe EP (see FIG. 2) so that the surface of the facing surface of the annular boss 34 is substantially flush with the exterior skin surface of the cowling AC. The mounting flange 32 preferably includes a circumferentially spaced apart series of apertures 32*a* for receiving therein rivets 33 so as to attach the mounting flange 32 to a skin interior portion of the cowling AC (see FIGS. 6 and 8).

A plug member 36 having a plug head 36*a* and a rearwardly projecting stem 36*b* may optionally be mounted within the receiving cylinder 30. The stem 36*b* extends through an opening 30*b* at the base of the receiving cylinder 30 and includes a retaining clip 36*c* at a terminal end thereof to limit the amount of forward displacement of the plug member 36 and ensure that the surface of the plug head 36*a* is substantially flush with the surrounding facing surface of the annular boss 34 and the exterior skin surface of the cowling AC. The plug head 36*a* is thus sized and configured to substantially block access to the receiving cylinder 30 when the QD swivel pin 22*a* is disengaged from the pin receiver 22*b*, but is displaceable within the receiving cylinder 30 against the bias force of the compression spring 38 in response to insertion of the pin 27*a* into the receiving cylinder 30.

Figure 5:
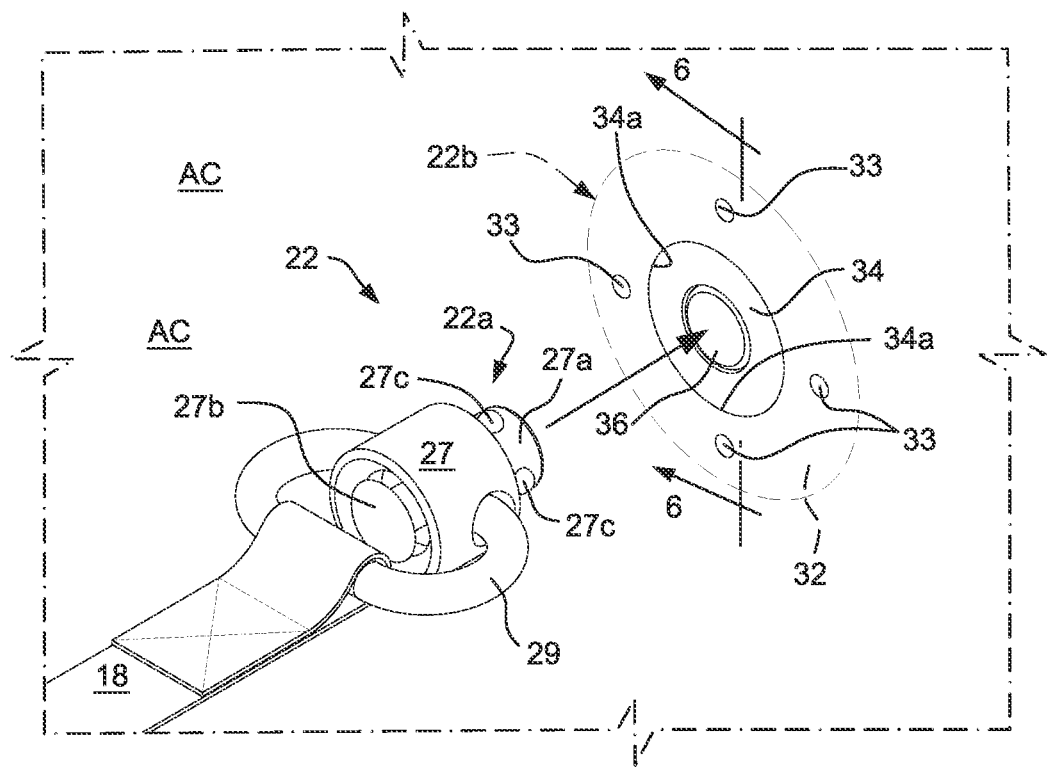
FIG. 5 is an enlarged perspective view of the cowling attachment assembly employed in the propeller restraint kit showing the quick disconnect (QD) swivel pin disengaged from the pin receiver when installed on the turboprop aircraft as shown in FIG. 2.
Figure 6:
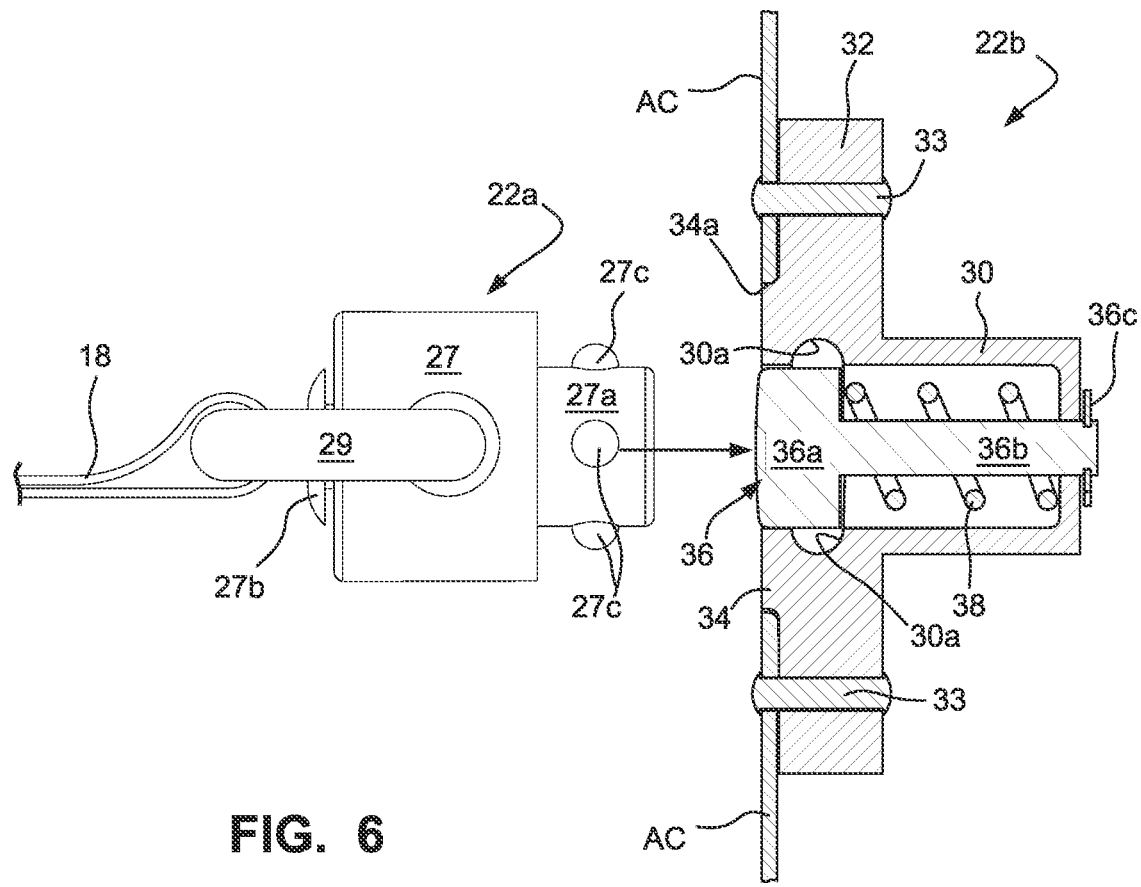
FIG. 6 is a cross-sectional elevational view of the cowling attachment assembly as shown in FIG. 6-6 of FIG. 5.
Figure 7:
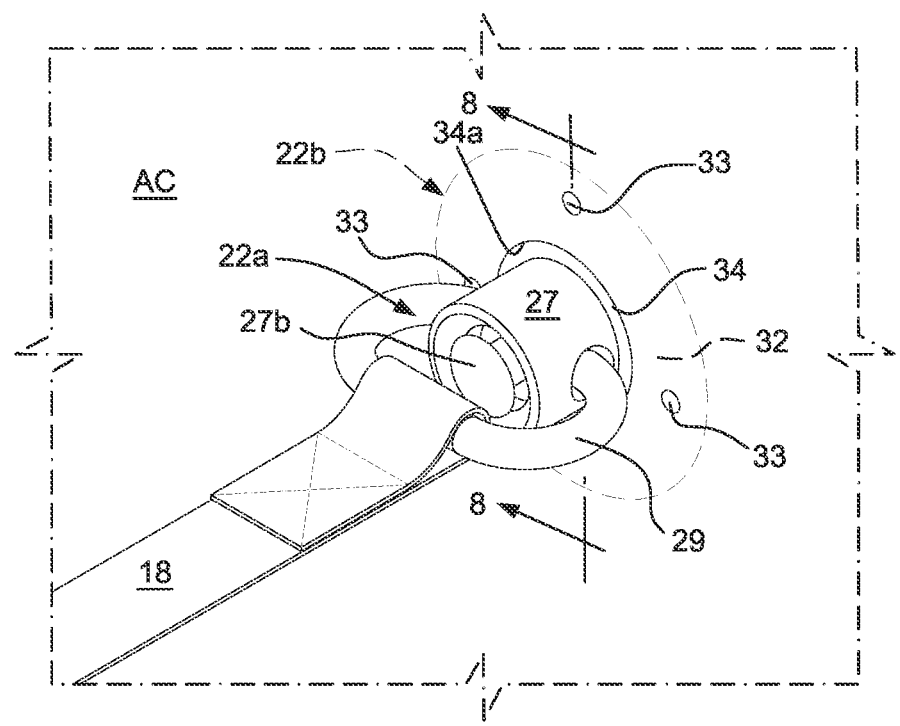
FIG. 7 is an enlarged perspective view of the cowling attachment assembly employed in the propeller restraint kit showing the quick disconnect (QD) swivel pin engaged with the pin receiver when installed on the turboprop aircraft as shown in FIG. 2.
Figure 8:
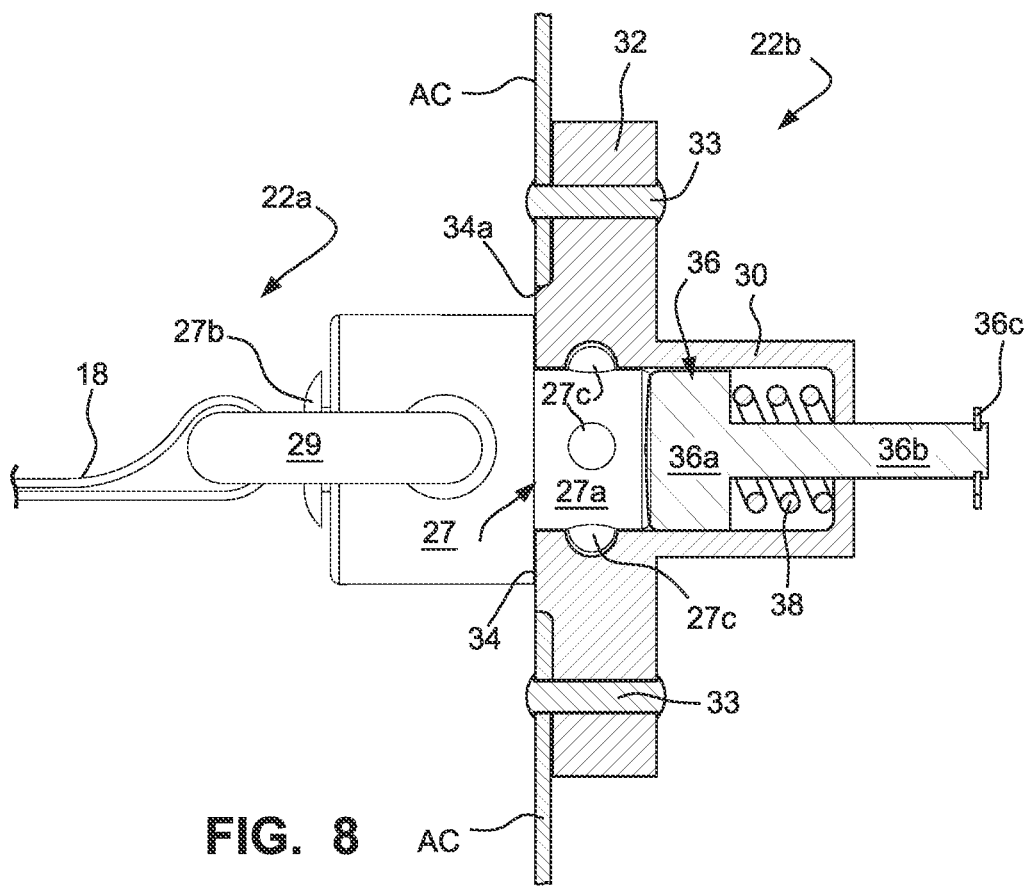
FIG. 8 is a cross-sectional elevational view of the cowling attachment assembly as shown in FIG. 8-8 of FIG. 7.

The operative interaction of the cowling attachment assembly 22 is shown in greater detail in accompanying FIGS. 5-8 which show the pin receiver 22*b* attached to the interior skin surface of the aircraft cowling, whereby FIGS. 5 and 6 show the QD swivel pin 22*a* and the pin receiver 22*b* in a disengaged state and FIGS. 7 and 8 show the QD swivel pin 22*a* and the pin receiver 22*b* in an engaged state. In use, the propeller boot 14 may initially be placed over the tip of a propeller AP and, if present, the exhaust pipe boot 26 may be placed over the terminal end portion of the exhaust pipe EP. Thereafter, the pin 27*a* of the QD swivel pin 22 may be aligned with the receiving cylinder 30 as shown in FIGS. 5 and 6. Depressing the plunger 27*b* of the QD swivel pin 22*a* will therefore allow the pin 27*a* to be inserted into the cylinder 30 while depressing the plug member 36 against the spring force of the compression spring 38. Releasing the plunger 27*b* will in turn cause the ball detents 27*c* to be positioned within the ball recesses 30*a* of the receiving cylinder 30 thereby removably attaching the QD swivel pin 22*a* to the pin receiver 22*b*.

In order to release the connection between the QD swivel pin 22*a* and the pin receiver 22*b*, the plunger 27*b* is again depressed which retracts the ball detents 27*c* and allows the pin 27*a* to be withdrawn from the receiving cylindrical 30.

Withdrawal of the pin 37a will in turn allow the plug head 36a of the plug member 36 to return under the spring force of the compression spring 38 to a position whereby the cylinder 30 is plugged.

It will be appreciated that since the tether strap 18 is of a predetermined fixed length, the operator does not need to make any further adjustments as there will be proper tension on the strap 18 provided by the removable interconnection between the QD swivel pin 22a and the pin receiver 22b. However, if an optional length adjuster such as the adjuster 23 of strap 16, then length adjustment can be made to establish the proper tension on the strap.

Therefore, while reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A propeller restraint kit for turboprop aircraft comprising:
   an open-ended propeller restraint boot sized and configured for placement over a tip of a propeller blade;
   a cowling attachment assembly adapted to being attached to an aircraft cowling skin; and
   a propeller boot tether strap of predetermined length interconnecting the propeller restraint boot and the cowling attachment assembly, wherein
   the cowling attachment assembly includes:
      (i) a quick disconnect (QD) pin assembly connected to a terminal end of the propeller boot tether strap, and
      (ii) a pin receiver adapted to being positionally attached to an interior portion of the aircraft cowling skin, the pin receiver including a pin receiving cylinder which is adapted to being positioned relative to a hole in the aircraft cowling skin to receive the quick disconnect pin and thereby removably attach the QD pin assembly and the pin receiver.

2. The propeller restraint kit according to claim 1, wherein the pin receiver includes a mounting flange for attaching the pin receiver to the interior portion of the aircraft cowling skin.

3. The propeller restraint kit according to claim 1, wherein the mounting flange defines a series of apertures adapted to receiving a rivet to immovably attached the mounting flange to the interior portion of the aircraft cowling skin.

4. The propeller restraint kit according to claim 2, wherein the pin receiver comprises an annular boss extending outwardly from a facing surface of the mounting flange, the annular boss being sized and configured to be positioned within the hole of the aircraft cowling skin.

5. The propeller restraint kit according to claim 1, wherein the propeller restraint boot is formed of a flexible fabric material.

6. The propeller restraint kit according to claim 1, wherein the propeller restraint boot includes a grommeted drain hole.

7. The propeller restraint kit according to claim 1, wherein the QD pin assembly comprises a strap swivel connected to the terminal end of the propeller boot tether strap.

8. The propeller restraint kit according to claim 1, wherein the pin receiver further includes a plug member which is moveably positioned within the receiving cylinder to plug the receiving cylinder upon disconnection of the QD pin and the pin receiver.

9. The propeller restraint kit according to claim 8, wherein the plug member includes a plug head and a plug stem having a terminal end coaxially extending outwardly from the receiving cylinder, and a retaining pin attached to the terminal end of the plug stem.

10. The propeller restraint kit according to claim 9, wherein the pin receiver further includes a compression spring positioned within the receiving cylinder and operably exerting spring force on the plug member.

11. The propeller restraint kit according to claim 1, further comprising:
   an exhaust pipe boot which is sized and configured to being placed over an end of an aircraft engine exhaust pipe, and
   an exhaust pipe boot tether strap having one end connected to the exhaust pipe boot and an opposite end connected to an intermediate portion of the propeller boot tether strap.

12. The propeller restraint kit according to claim 1, wherein the propeller restraint tether strap includes a length adjuster to allow length adjustment of the propeller restraint tether strap.

13. A propeller restraint kit for a turboprop aircraft comprising a pair of propeller restraint systems adapted to restraining propeller blades of a turboprop aircraft in an inverted V-shaped configuration, wherein each of the propeller restraint systems comprises:
   an open-ended propeller restraint boot sized and configured for placement over a tip of a propeller blade;
   a cowling attachment assembly adapted to being attached to an aircraft cowling skin; and
   a propeller boot tether strap of predetermined length interconnecting the propeller restraint boot and the cowling attachment assembly, wherein the cowling attachment assembly includes:
      (i) a quick disconnect (QD) pin assembly connected to a terminal end of the propeller boot tether strap, and
      (ii) a pin receiver adapted to being positionally attached to an interior portion of the aircraft cowling skin, the pin receiver including a pin receiving cylinder which is adapted to being positioned relative to a hole in the aircraft cowling skin to receive the quick disconnect pin and thereby removably attach the QD pin assembly and the pin receiver.

14. The propeller restraint kit according to claim 13, wherein the pin receiver includes a mounting flange for attaching the pin receiver to the interior portion of the aircraft cowling skin.

15. The propeller restraint kit according to claim 14, wherein the mounting flange defines a series of apertures adapted to receiving a rivet to immovably attached the mounting flange to the interior portion of the aircraft cowling skin.

16. The propeller restraint kit according to claim 13, wherein the pin receiver comprises an annular boss extending outwardly from a facing surface of the mounting flange, the annular boss being sized and configured to be positioned within the hole of the aircraft cowling skin.

17. The propeller restraint kit according to claim 13, wherein the pin receiver further includes a plug member which is moveably positioned within the receiving cylinder to plug the receiving cylinder upon disconnection of the QD pin and the pin receiver.

18. The propeller restraint kit according to claim 17, wherein the plug member includes a plug head and a plug stem having a terminal end coaxially extending outwardly from the receiving cylinder, and a retaining pin attached to the terminal end of the plug stem.

19. The propeller restraint kit according to claim 18, wherein the pin receiver further includes a compression spring positioned within the receiving cylinder and operably exerting spring force on the plug member.

20. The propeller restraint kit according to claim 13, wherein the propeller restraint boot is formed of a flexible fabric material.

21. The propeller restraint kit according to claim 13, wherein the propeller restraint boot includes a grommeted drain hole.

22. The propeller restraint kit according to claim 13, wherein the QD pin assembly comprises a strap swivel connected to the terminal end of the propeller boot tether strap.

23. The propeller restraint kit according to claim 13, further comprising:
   an exhaust pipe boot which is sized and configured to being placed over an end of an aircraft engine exhaust pipe, and
   an exhaust pipe boot tether having one end connected to the exhaust pipe boot and an opposite end connected to an intermediate portion of the propeller boot tether strap.

24. The propeller restraint kit according to claim 13, wherein the propeller restraint tether strap of at least one of the propeller restraint systems includes a length adjuster to allow length adjustment of the propeller restraint tether strap.

25. A turboprop aircraft which comprises a pair of propeller restraint systems to restrain propellers of the aircraft in an inverted V-shaped configuration, wherein each of the propeller restraint systems comprises:

an open-ended propeller restraint boot positioned over a tip of a propeller blade;
a cowling attachment assembly positionally fixed to cowling skin of the aircraft; and
a propeller boot tether strap of predetermined length interconnecting the propeller restraint boot and the cowling attachment assembly, wherein
the cowling attachment assembly includes:
   (i) a quick disconnect (QD) pin assembly connected to a terminal end of the propeller boot tether strap, and
   (ii) a pin receiver attached to an interior portion of cowling skin of the aircraft, wherein the cowling skin of the aircraft defines a hole and wherein the pin receiver includes a pin receiving cylinder which is positioned relative to the hole in the aircraft cowling skin to receive the quick disconnect pin and thereby removably attach the QD pin assembly and the pin receiver.

26. The aircraft according to claim 25, wherein the pin receiver includes a mounting flange attached to the interior portion of the aircraft cowling skin.

27. The propeller restraint kit according to claim 26, wherein the mounting flange defines a series of apertures, and wherein the pin receiver is attached to the interior portion of the aircraft cowling skin by rivets through the aircraft cowling skin and the apertures of the mounting flange.

28. The propeller restraint kit according to claim 26, wherein the pin receiver comprises an annular boss extending outwardly from a facing surface of the mounting flange, the annular boss being sized and configured to be positioned within the hole of the aircraft cowling skin so that an exterior surface of the aircraft cowling skin.

* * * * *